United States Patent
Takahashi (10) Patent No.: US 10,310,844 B2
(45) Date of Patent: Jun. 4, 2019

(54) ELECTRONIC APPARATUS, VERSION CHECKING SYSTEM AND RECORDING MEDIUM

(71) Applicant: KYOCERA Document Solutions Inc., Osaka (JP)

(72) Inventor: Minoru Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/854,484

(22) Filed: Dec. 26, 2017

(65) Prior Publication Data

US 2018/0181388 A1      Jun. 28, 2018

(30) Foreign Application Priority Data

Dec. 26, 2016   (JP) ................. 2016-250912

(51) Int. Cl.
| | |
|---|---|
| *G06F 8/35* | (2018.01) |
| *G06F 8/654* | (2018.01) |
| *G06F 3/12* | (2006.01) |
| *G06F 21/57* | (2013.01) |
| *G06F 8/65* | (2018.01) |

(52) U.S. Cl.
CPC ............. *G06F 8/654* (2018.02); *G06F 3/122* (2013.01); *G06F 3/123* (2013.01); *G06F 3/1285* (2013.01); *G06F 8/65* (2013.01); *G06F 21/57* (2013.01); *G06F 21/572* (2013.01)

(58) Field of Classification Search
CPC ........ G06F 8/654; G06F 3/123; G06F 3/1285; G06F 21/57; G06F 3/122
See application file for complete search history.

(56) References Cited

U.S. PATENT DOCUMENTS

| | | | | |
|---|---|---|---|---|
| 2011/0276956 A1* | 11/2011 | Yuki | ........................ | G06F 8/65 717/170 |
| 2014/0047430 A1* | 2/2014 | Kanematsu | ............... | G06F 8/65 717/170 |
| 2014/0373000 A1* | 12/2014 | Kanematsu | ............... | G06F 8/65 717/170 |

FOREIGN PATENT DOCUMENTS

JP      2009-230398 A      10/2009

* cited by examiner

*Primary Examiner* — Wei Y Zhen
*Assistant Examiner* — Amir Soltanzadeh
(74) *Attorney, Agent, or Firm* — Hawaii Patent Services; Nathaniel K. Fedde; Kenton N. Fedde (57) ABSTRACT

Provided is an electronic apparatus that performs updating of firmware easily and reliably. An EEPROM stores firmware that is divided according to function and that controls standard installed functions that are correlated with model-identification information, and firmware that controls functions of optional apparatuses. A firmware-managing unit manages firmware information that includes the versions of the firmware. A system-control unit that, when there is an update instruction via the panel unit, requests an information-distributing server that distributes the most recent versions of the firmware to perform an update that includes the model-identification information. As a result, even when firmware that controls functions of added optional apparatuses is newly installed, the system-control unit can update the firmware that is stored in the EEPROM to the most recent versions of firmware downloaded from the information-distributing server.

6 Claims, 8 Drawing Sheets

| USER-IDENTIFICATION INFORMATION | MODEL-IDENTIFICATION INFORMATION | FIRMWARE INFORMATION | | | |
|---|---|---|---|---|---|
| | | FUNCTION TYPE A | FUNCTION TYPE B | FUNCTION TYPE C | FUNCTION TYPE D |
| AA0001 | B5D2077PRI | Official A ver.1.0 | Official B ver.1.0 | NONE | Official D ver.1.0 |
| AA0002 | B4C2066PRI | Official A ver.1.0 | Official B ver.1.0 | Official C ver.1.0 | NONE |
| AA0003 | D3E2055PRI | Custom A ver.1.0 | Official B ver.1.0 | Official C ver.1.0 | Official D ver.1.0 |
| AA0004 | D2F2044PRI | Custom A ver.1.0 | Official B ver.1.0 | Custom C ver.1.0 | Official D ver.1.0 |

| USER-IDENTIFICATION INFORMATION 401 | MODEL-IDENTIFICATION INFORMATION 402 | FIRMWARE INFORMATION 403 (USER-MANAGEMENT TABLE) 400A | | | |
|---|---|---|---|---|---|
| | | FUNCTION TYPE A | FUNCTION TYPE B | FUNCTION TYPE C | FUNCTION TYPE D |
| AA0001 | D5D2077PR1 | Official A ver. 1.0 | Official B ver. 1.0 | NONE | Official D ver. 1.0 |
| AA0002 | D4C2086PR1 | Official A ver. 1.0 | Official B ver. 1.0 | Official C ver. 1.0 | NONE |
| AA0003 | D3E2055PR1 | Custom A ver. 1.0 | Official B ver. 1.0 | Official C ver. 1.0 | Official D ver. 1.0 |
| AA0004 | D2F2044PR1 | Custom A ver. 1.0 | Official B ver. 1.0 | Custom C ver. 1.0 | Official D ver. 1.0 |

FIG.3B (UPDATE-INFORMATION-MANAGEMENT TABLE)

| COMBINATION INFORMATION | FIRMWARE INFORMATION | | | |
|---|---|---|---|---|
| | FUNCTION TYPE A | FUNCTION TYPE B | FUNCTION TYPE C | FUNCTION TYPE D |
| COMBINATION 1 | Official A ver.1.5 | Official B ver.1.5 | Official C ver.1.5 | Official D ver.1.5 |
| COMBINATION 2 | Official A ver.2.0 | Official B ver.2.0 | Official C ver.2.0 | Official D ver.2.0 |
| COMBINATION 3 | Custom A ver.2.0 | Official B ver.1.5 | Official C ver.1.5 | Official D ver.1.5 |
| COMBINATION 4 | Custom A ver.1.5 | Official B ver.1.0 | Custom C ver.1.5 | Official D ver.1.0 |

FIG.4 (USER-MANAGEMENT TABLE)

| USER-IDENTIFICATION INFORMATION | MODEL-IDENTIFICATION INFORMATION | FIRMWARE INFORMATION | | | |
|---|---|---|---|---|---|
| | | FUNCTION TYPE A | FUNCTION TYPE B | FUNCTION TYPE C | FUNCTION TYPE D |
| AA0001 | D5D2077PRI | Official A ver.1.0 | Official B ver.1.0 | NONE | Official D ver.1.0 |
| AA0002 | D4C2066PRI | Official A ver.1.0 | Official B ver.1.0 | Official C ver.1.0 | NONE |
| AA0003 | D3E2055PRI | Custom A ver.1.0 | Official B ver.1.0 | Official C ver.1.0 | Official D ver.1.0 |
| AA0004 | D2F2044PRI | Custom A ver.1.0 | Official B ver.1.0 | Custom C ver.1.0 | Official D ver.1.0 |

FIG.5 (PROCESSING ON MFP SIDE)

ELECTRONIC APPARATUS, VERSION CHECKING SYSTEM AND RECORDING MEDIUM

INCORPORATION BY REFERENCE

This application is based on and claims the benefit of priority from Japanese Patent Application No. 2016-250912 filed on Dec. 26, 2016, the contents of which are hereby incorporated by reference.

BACKGROUND

The present disclosure relates to an electronic apparatus that is suitable for version management of firmware, a version checking system and a recording medium.

In the case of an image forming apparatus that is a MFP (Multifunction Peripheral) such as a multifunction printer, combined machine or the like, for example, there are models that include a printing function, a copying function, a FAX function, a data transmitting/receiving function via a network and the like as standard installed functions. These standard installed functions are respectively executed based on dedicated software, however, it is expected that functions will be even further increased in the future.

Moreover, in order to guarantee operation, it is preferred that firmware for operating the hardware in accordance with the respective standard installed functions be a combination of the latest versions of firmware. Therefore, firmware is updated as needed, and, for example, in order to improve the processing speed of updates, processing may be divided according to respective function. In other words, firmware that is divided according to respective function can be individually updated. Furthermore, each firmware has version information that includes a unique function name and version number, so it is possible to determine whether or not the firmware is the most recent by checking the respective version information.

In typical technology for updating firmware, a software-update-support program on the managing server side uses a guaranteed-version-combination table to determine whether or not the combination of version information of each software that is installed in a PC (Personal Computer) is a combination of guaranteed version information. When the combination is not a combination of guaranteed version information, there is a software-update-support apparatus that causes the software required for the combination to become a combination of version information for which operation is guaranteed to be downloaded and updated.

SUMMARY

The electronic apparatus according to the present disclosure includes a panel unit, a storage device, a firmware-managing unit and a system-control unit. The storage device stores firmware that is divided according to function and that controls standard installed functions that are correlated with model-identification information, and firmware that controls functions of added optional apparatuses. The firmware-managing unit manages firmware information that includes each of the versions of the respective firmware. The system-control unit, when there is an update instruction via the panel unit, requests an information-distributing server that distributes the firmware that corresponds to a combination of the most recent versions of the respective firmware that is correlated with the model-identification information to perform an update that includes the model-identification information. The system-control unit updates the firmware that is stored in the storage device to firmware that corresponds to a combination of the most recent versions that are downloaded from the information-distributing server. The firmware-managing unit changes the versions of the firmware information.

The version checking system according to the present disclosure includes an electronic apparatus and a managing apparatus that is capable of communicating with the electronic apparatus. The managing apparatus has a panel unit. The electronic apparatus includes a storage device, a firmware-managing unit and a system-control unit. The storage device stores firmware that is divided according to function and that controls standard installed functions that are correlated with model-identification information, and firmware that controls functions of added optional apparatuses. The firmware-managing unit manages firmware information that includes each of the versions of the respective firmware. The system-control unit, when there is an update instruction via the panel unit, requests an information-distributing server that distributes the firmware that corresponds to a combination of the most recent versions of the respective firmware that is correlated with the model-identification information to perform an update that includes the model-identification information. The system-control unit updates the firmware that is stored in the storage device to firmware that corresponds to a combination of the most recent versions that are downloaded from the information-distributing server. The firmware-managing unit changes the versions of the firmware information.

The non-transitory computer readable recording medium according to the present disclosure stores a version-checking program that can be executed by a computer of an electronic apparatus. The version-checking program causes the computer to store firmware that is divided according to function and that controls standard installed functions that are correlated with model-identification information, and firmware that controls functions of added optional apparatuses in a storage device. Moreover, the version-checking program causes the computer to operate as a firmware-managing unit that manages firmware information that includes each of the versions of the respective firmware, and a system-control unit that, when there is an update instruction via the panel unit, requests an information-distributing server that distributes the firmware that corresponds to a combination of the most recent versions of the respective firmware that is correlated with the model-identification information to perform an update that includes the model-identification information. Furthermore, the system-control unit updates the firmware that is stored in the storage device to firmware that corresponds to a combination of the most recent versions that are downloaded from the information-distributing server. Moreover, the firmware-managing unit changes the versions of the firmware information.

DETAILED DESCRIPTION

In the following, an embodiment of an electronic apparatus according to the present disclosure will be explained with reference to FIG. 1 to FIG. 6. As an example of an electronic apparatus in the following explanation is a MFP Multifunction Peripheral) that is a combined peripheral apparatus that includes, for example, standard installed functions such as a printing function, a copying function, a FAX function, a data transmitting/receiving function via a network and the like.

Figure 1:
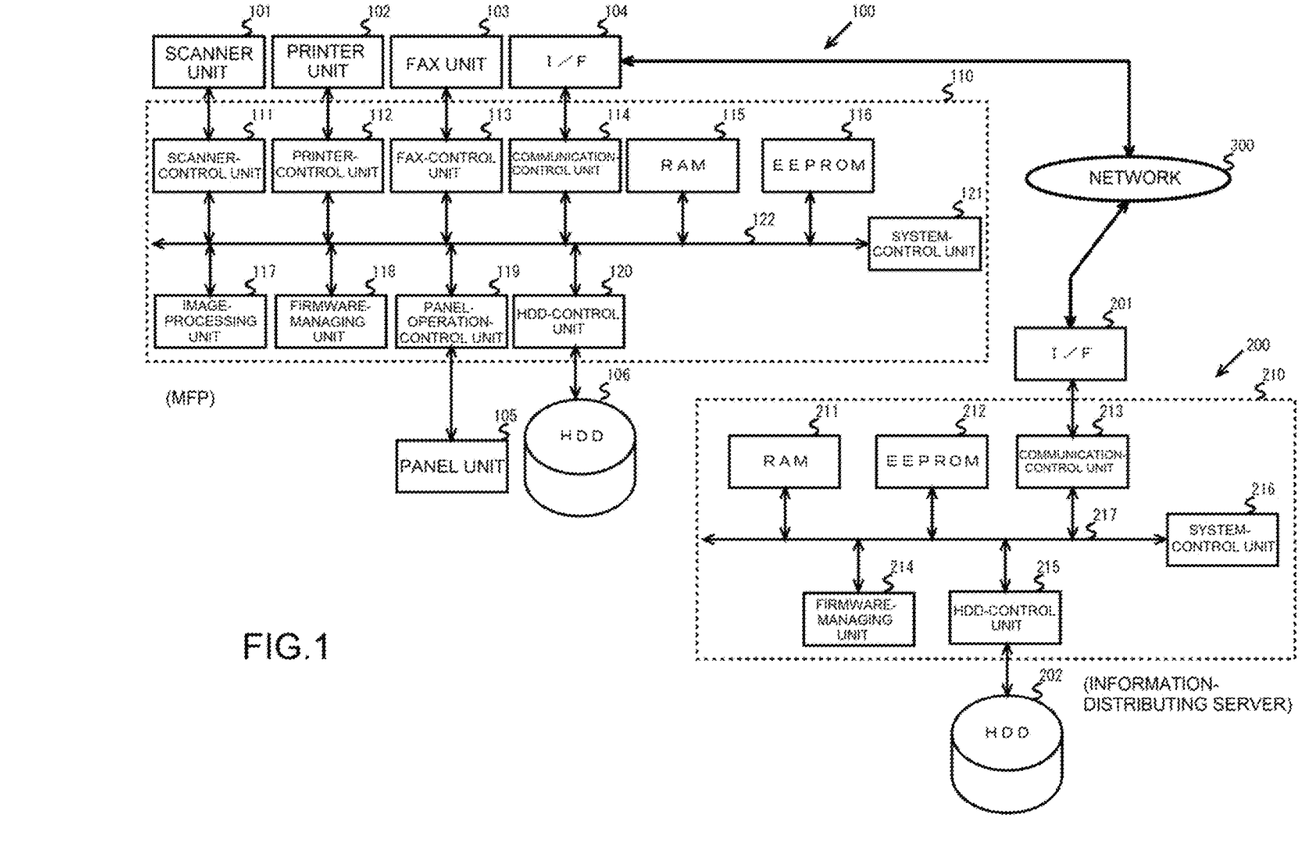
FIG. 1 illustrates an embodiment when the electronic apparatus according to the present disclosure is applied to a MFP.

First, as illustrated in FIG. 1, a MFP 100 is connected to an information-distributing server 200 that distributes information such as firmware and the like via a network 300 such as the Internet and the like. Moreover, the MFP 100, as will be described in detail later, downloads the most recent versions of firmware from the information-distributing server 200 that guarantee operation by a combination of all the firmware, including firmware that controls the functions of various optional apparatuses.

Here, the MFP 100 includes a control unit 110 that controls the operation of a scanner unit 101, a printer unit 102, a FAX unit 103, an I/F (interface) 104, a panel unit 105 and a HDD 106.

The scanner unit 101 is a device that converts an image of a document that is read by an image sensor to digital image data, and inputs that digital image data to the control unit 110. The printer unit 102 is a device that, based on printing data that is outputted from the control unit 110, prints an image on paper. The FAX unit 103 is a device that transmits data that is outputted from the control unit 110 to a facsimile of another party via telephone lines, and receives data from the facsimile of another party and inputs that data to the control unit 110.

The I/F 104 is connected to the information-distributing server 200 via the network 300. The I/F 104 maybe take charge of communication with other MFPs, user terminals and the like, and may also take charge of communication with a content server, web server and the like. The panel unit 105 is a device such as a touch panel that performs a display for the printing function, copying function, FAX function, data transmitting/receiving function via a network 300 of the MFP 100, and for perform various settings. The HDD 106 is a storage device that stores application programs and the like for providing the various functions of the MFP 100. Moreover, the HDD 106 has user boxes for storing, for example, printing jobs that are registered from the user terminal side, data corresponding to printing in page description language, and the like.

The control unit 110 is a processor that controls the overall operation of the MFP 100 by executing application programs such as an authentication program and the like, an image forming program, control program and the like. The control unit 110 includes a scanner-control unit 111, a printer-control unit 112, a FAX (Facsimile) control unit 113, a communication-control unit 114, a RAM (Random Access Memory) 115, an EEPROM (Electrically Erasable Programmable Read-Only Memory) 116, an image-processing unit 117, a firmware-managing unit 118, a panel-operation-control unit 119, a HDD-control unit 120, and a system-control unit 121. Moreover, these units are connected to a data bus 122.

The scanner-control unit 111 controls the reading operation of the scanner unit 101. The printer-control unit 112 controls the printing operation of the printer unit 102. The FAX-control unit 113 controls the data transmitting/receiving operation of the FAX unit 103. The communication-control unit 114, via the I/F 104, performs control of transmitting/receiving data and the like via the network 300.

Figure 2A:
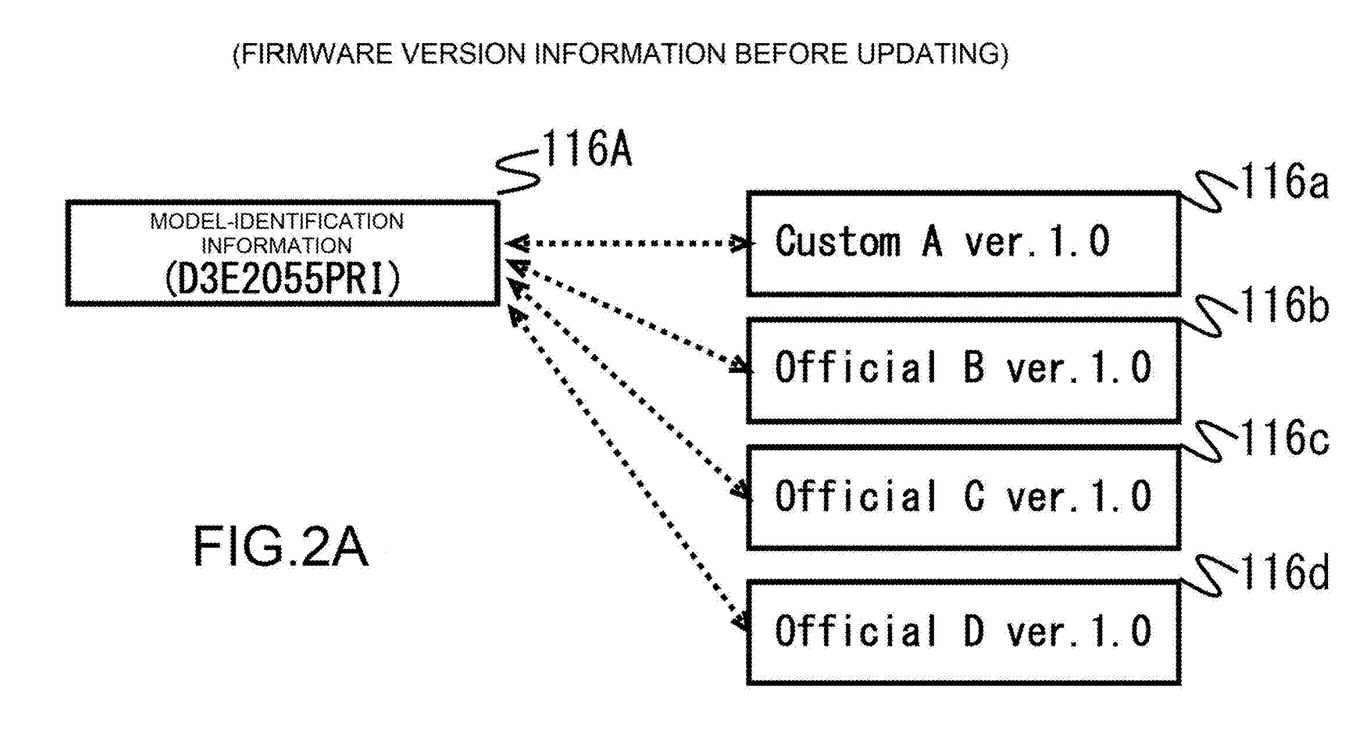
FIG. 2A explains firmware and the like that is installed in the MFP in FIG. 1, and illustrates version information and the like of firmware that is stored in the EEPROM in FIG. 1 before updating.

The RAM 115 is a work memory for executing programs. Moreover, the RAM 115 stores printing data that has undergone image processing by the image-processing unit 117. The EEPROM 116 stores a control program for performing operation checks and the like of each of the units. Moreover, the EEPROM 116 stores firmware for operating the scanner unit 101, the printer unit 102, the FAX unit 103, the I/F (interface) 104, panel unit 105 and HDD 106 and the like. The firmware, for example, is divided according to each function in order to improve the processing speed for updates. Moreover, the respective firmware that is divided according to each function has firmware information 116a to 116d as illustrated in FIG. 2A described later that includes a unique function name and version number, and will be described in detail later.

The image-processing unit 117 performs image processing (rasterization) on image data that is read by the scanner unit 101. Moreover, the image-processing unit 117 performs image processing (rasterization) on printing target data that is registered in a user box in the HDD 106. The system-control unit 121 temporarily stores the printing data that has undergone image processing by the image-processing unit 117 in the RAM 115.

Figure 2B:
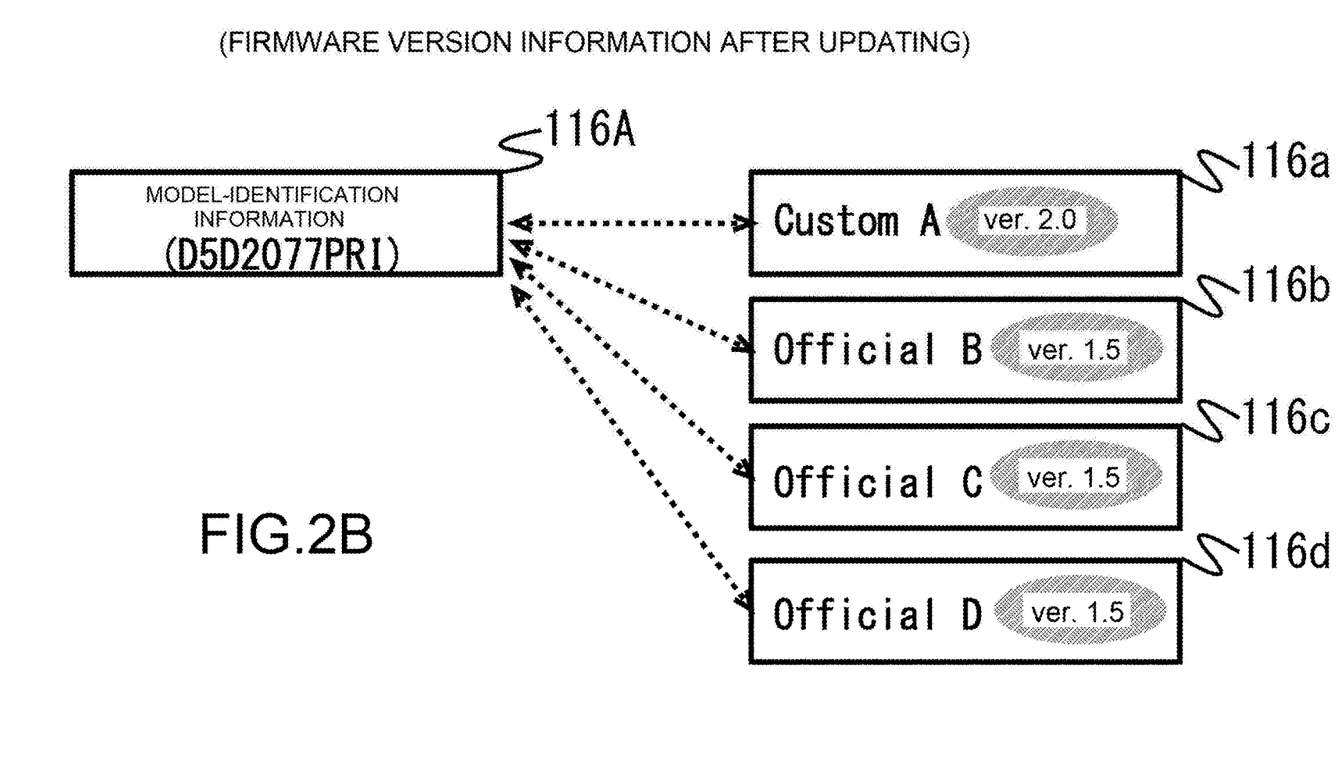
FIG. 2B explains firmware and the like that is installed in the MFP in FIG. 1, and illustrates version information and the like of firmware that is stored in the EEPROM in FIG. 1 after updating.

The firmware-managing unit 118, as will be described in detail later, manages firmware information 116a to 116d illustrated in FIG. 2A described later of the most recent versions of firmware that guarantee operation of the firmware. Moreover, when update firmware is downloaded from the information-distributing server 200, the firmware-managing unit 118, as will be described in detail later, rewrites the firmware information 116a to 16d as illustrated in FIG. 2B described later.

The panel-operation-control unit 119 controls the display operation of the panel unit 105. Moreover, the panel-operation-control unit 119, via the panel unit 105, receives the start of printing, copying, FAX, data transmission/reception via the network 300 or the like. Furthermore, the panel-operation-control unit 119, based on an instruction from the system-control unit 121, causes the panel unit 105 to display the check results of the firmware-managing unit 118. Moreover, the panel-operation-control unit 119, via the panel unit 105, receives instructions and the like for updating to the most recent version.

The system-control unit 121 controls cooperative operation of each of the units. Moreover, when copying or printing is selected via the panel unit 105, the system-control unit 121, via the scanner-control unit 111 or the printer-control unit 112, controls reading of a document by the scanner unit 101, or printing on paper by the printer unit 102. Furthermore, the when a firmware update instruction is given via the panel unit 105, the system-control unit 121 requests the information-distributing server 200 to perform an update that includes, for example, model-identification information 402 illustrated in FIG. 3A described later. The system-control unit 121 may also request an update that includes user-identification information 401 in addition to model-identification information 402.

On the other hand, the information-distributing server 200 includes a control unit 210 that controls an I/F 201, and a HDD 202. The I/F 201 is connected to the MFP 100 via the network 300. The I/F 201 may take charge of communication with other MFPs, user terminals and the like. The HDD 202 distributes a user-management table 400A, 400B illustrated in FIG. 3A and FIG. 4 described later, an update-information-management table 500 illustrated in FIG. 3B described later, update firmware and the like.

The control unit 210 is a processor that controls the overall operation of information-distributing server 200 by executing a control program. The control unit 210 includes a RAM 211, EEPROM 212, a communication-control unit 213, a firmware-managing unit 214, a HDD-control unit 215 and a system-control unit 216. Moreover, these units are connected to a data bus 217.

Figure 3A:
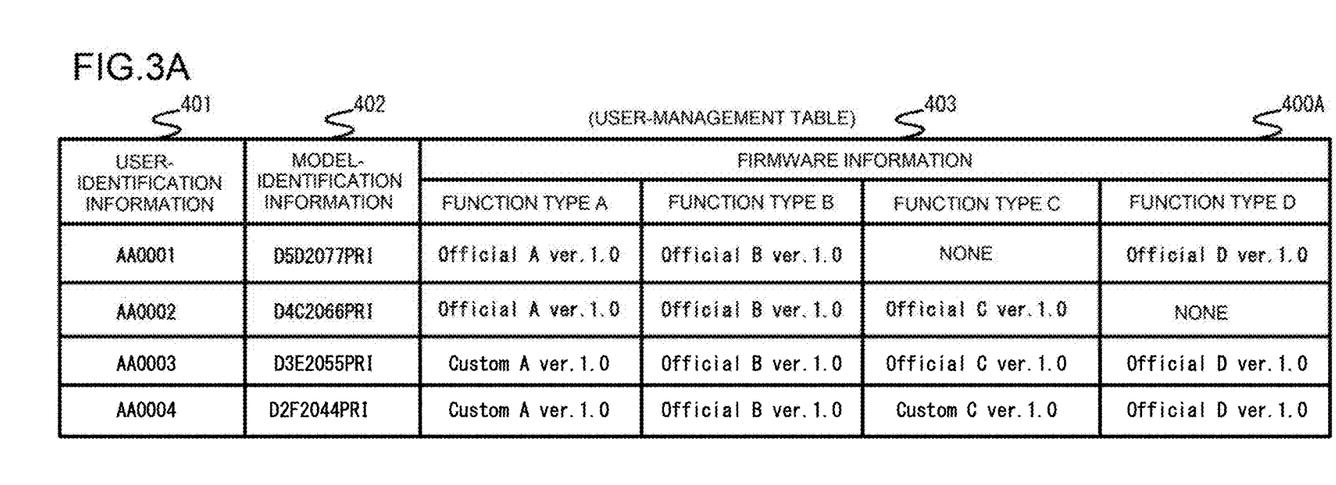
FIG. 3A explains a management table that is managed by the information-distributing server in FIG. 1, and illustrates a user-management table.
Figure 3B:
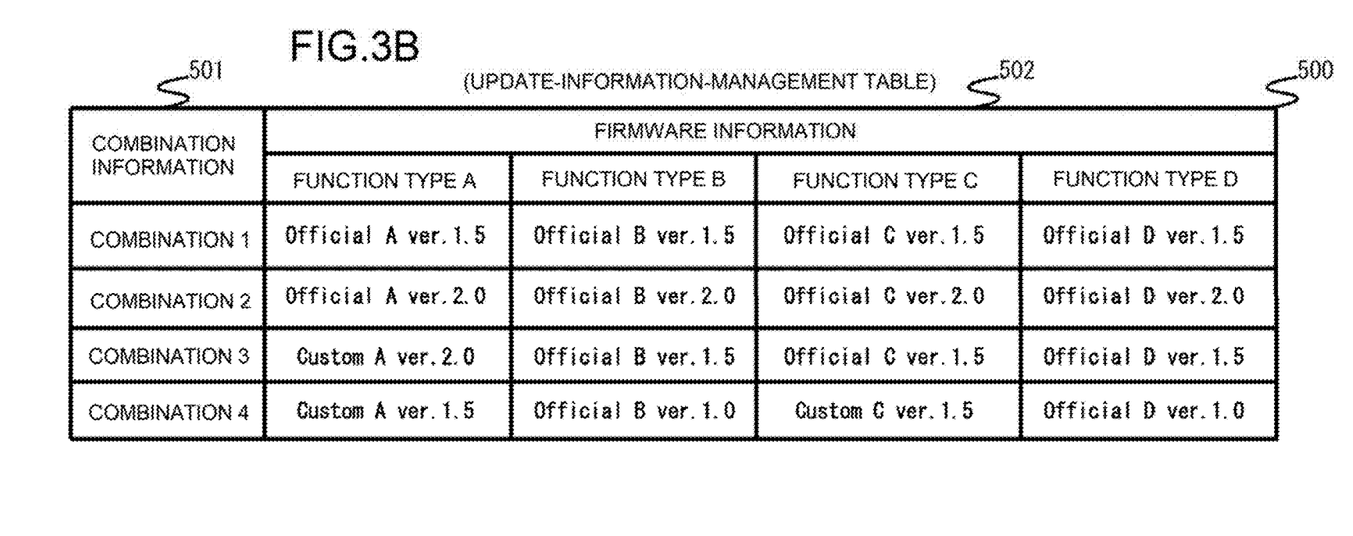
FIG. 3B explains a management table that is managed by the information-distributing server in FIG. 1, and illustrates an up date-information-management table.

The RAM 211 is a work memory for executing programs. The EEPROM 212 stores a control program for performing operation checks and the like of each of the units. The communication-control unit 213, via the I/F 201, performs control of transmission/reception of data over the network 300. Moreover, the communication-control unit 213 receives requests from the MFP 100 for updating firmware. Furthermore, the communication-control unit 213 transmits firmware for updating to the MFP 100. The firmware-managing unit 214 manages the user-management table 400A, 400B, and the update-information-management table 500 and the like described above that are stored in the HDD 202.

The system-control unit 216, via the communication-control unit 213, receives the update request described above from the MFP 100, and then causes the firmware-managing unit 214 to search for firmware update information. Moreover, the system-control unit 216 reads the firmware that corresponds to the update information that is found by the firmware-managing unit 214, and transmits that firmware to the MFP 100 via the communication-control unit 213.

Next, the firmware and the like that is installed in the MFP 100 will be explained with reference to FIG. 2A and FIG. 2B. In the explanation below, it is presumed that a mix of firmware that corresponds to the standard installed functions, firmware that corresponds to functions of optional apparatuses, firmware in the case in which specifications of any of the functions of added optional apparatuses or standard installed functions are customized for each user is installed in the MFP 100. Standard installed functions are a printing function, a copying function, a FAX function, a data transmitting/receiving function via a network and the like. The functions of optional apparatuses are, for example, functions of an automatic feeder for double-sided documents that automatically supplies paper that is to be printed on both sides, a finisher that performs sorting and stapling of plural sheets during printing, mailboxes that are specified as the respective output destinations of plural trays and that prevent mixing of outputted sheets, and the like. However, for the convenience of explanation, it is presumed that firmware that corresponds to four functions of any one of these functions is installed.

First, FIG. 2A illustrates firmware version information that is stored in the EEPROM 116 before updating. The firmware version information, for example, includes firmware information 116a to 116d that is correlated to the apparatus identification information 116A indicated by (D3E2055PRI). The firmware information 116a to 116d includes function names and version numbers of the MFP 100.

In other words, firmware information 116a is taken to indicate, for example (Custom A ver. 1.0). Moreover, firmware information 116b is taken to indicate, for example, (Official B ver. 1.0). Furthermore, firmware information 116c is taken to indicate, for example, (Official C ver. 1.0). Moreover, firmware information 116d is taken to indicate, for example, (Official D ver. 1.0). Here, (Custom A), (Official B), (Official C) and (Official D) indicate function names, and (ver. 1.0) indicates the version number. (Custom A) of firmware information 116a indicates a function name in the case in which the specification of any function of an optional apparatus or a standard installed function is customized for each user. Moreover, (Official B), (Official C) and (Official D) of firmware information 116b to 116d indicate the case in which the specifications of a function of an optional apparatus or a standard installed function are genuine.

Moreover, FIG. 2B illustrates firmware version information that is stored in the EEPROM 116 after updating. In FIG. 2B, the shaded portions indicate corrected locations after updating. Furthermore, the firmware version information illustrated in FIG. 2B is rewritten by the firmware-managing unit 118 by installing update firmware that is downloaded from the information-distributing server 200.

In FIG. 2B illustrates the case in which, for example, the firmware information 116a is updated to (ver. 2.0), the firmware information 116b is updated to (ver. 1.5), the firmware information 116c is updated to (ver. 1.5), and the firmware information 116d is updated to (ver. 1.5). The updates here are executed by downloading update firmware from the information-distributing server 200.

Next, the management table that is managed by the information-distributing server 200 will be explained with reference to FIG. 3A to FIG. 4. In the explanation below, as described above, it is presumed that firmware that corresponds to the standard installed functions, firmware that corresponds to functions of optional apparatuses, firmware in the case in which specifications of any of the functions of added optional apparatuses or standard installed functions are customized for each user are mixed and registered. However, for the convenience of explanation, it is presumed that firmware that corresponds to four functions of any one of these functions is registered. Moreover, the four functions, for example, are illustrated as function type A, function type B, function type C and function type D.

First, FIG. 3A illustrates a user-management table 400A. User-identification information 401, model-identification information 402, and firmware information 403 are registered in the user-management table 400A. The user-identification information 401 is allocated for managing customers, and, for example, is registered as AA0001 to AA0004. The model-identification information 402 is for identifying the respective models of different MFP 100, and, for example, is registered as D5D2077PRI, D4C2066PRI, D3E2055PRI and D2F2044PRI. The firmware information 403 is for distinguishing between the four functions described above, and, for example, are divided as function type A, function type B, function type C and function type D.

Here, in the field for the model-identification information 402 (D5D2077PRI) that corresponds to the user-identification information 401 (AA0001), function type A is taken to be registered as (Official A ver. 1.0), function type B is taken to be registered as (Official B ver. 1.0), function type C is taken to be registered as (none), and function type D is taken to be registered as (Official D ver. 1.0). Moreover, in the field for the model-identification information 402 (D4C2066PRI) that corresponds to the user-identification information 401 (AA0002), function type A is taken to be registered as (Official A ver. 1.0), function type B is taken to be registered as (Official B ver. 1.0), function type C is taken to be registered as (Official C ver. 1.0), and function type D is taken to be registered as (none). Furthermore, in the field for the model-identification information 402 (D3E2055PRI) that corresponds to the user-identification information 401 (AA0003), function type A is taken to be registered as (Custom A ver. 1.0), function type B is taken to be registered as (Official B ver. 1.0), function type C is taken to be registered as (Official C ver. 1.0), and function type D is taken to be registered as (Official D ver. 1.0). Moreover, in the field for the model-identification information 402 (D2F2044PRI) that corresponds to the user-identification information 401 (AA0004), function type A is taken to be registered as (Custom A ver. 1.0), function type B is taken to be registered as (Official B ver. 1.0), function type C is taken to be registered as (Custom C ver. 1.0), and function type D is taken to be registered as (Official D ver. 1.0).

In other words, for the MFP 100 that is used by the user having user-identification information 401 (AA0001), the firmware of function types A, B and D are all (Official). However, for function type C, there is no corresponding function mounted in the MFP 100, or in the case that a function is mounted, the function is in an unusable state, so is indicated as (none). Moreover, for the MFP 100 that is used by the user having user-identification information 401 (AA0002), the firmware of function types A, B and C are all (Official). However, for function type D, there is no corresponding function mounted in the MFP 100, or in the case that a function is mounted, the function is in an unusable state, so is indicated as (none). Furthermore, for the MFP 100 that is used by the user having user-identification information 401 (AA0003), the firmware of function types B to D are (Official). However, for function type A, the specifications of any function for an added optional apparatus or a standard installed function are customized, and is indicated as (Custom). Moreover, for the MFP 100 that is used by the user having user-identification information 401 (AA0004), the firmware of function types B and D are (Official). However, for function types A and C, the specifications of any of the functions for added optional apparatuses or standard installed functions are customized, and are indicated as (Custom).

Next, FIG. 3B illustrates a firmware update-information-management table 500. Combination information 501 and firmware information 502 are registered in the update-information-management table 500. Combinations 1 to 4, for example, are registered in the combination information 501. Combinations 1 to 4 indicate combinations of function types A to D. In other words, combination 1 indicates a combination in which the function types A to D are all (Official) and the version is (ver. 1.5). Combination 2 indicates a combination in which the function types A to D are all (Official), and the versions are all (ver. 2.0). Combination 3 indicates a combination in which function types B to D are (Official), however, function type A is (Custom). Moreover, the version of function type A is (ver. 2.0), and the version of function types B to D are (ver. 1.5). Combination 4 indicates a combination in which function types B and D are (Official), however, function types A and C are (Custom). Moreover, the version of function types B and D is (ver. 1.0), and the version of function types A and C is (ver. 1.5).

Here, the firmware-managing unit 214 of the information-distributing server 200, when there is an update request from the MFP 100 of user-identification information (AA0001), for example, checks the combination of function types A to D by referencing the user-management table 400A. Here, in the case of user-identification information 401 (AA0001), even though function type C is (none), this is a combination in which function types A, B and D are all (Official). In this case, the firmware-managing unit 214 searches for a combination from the update-information-management table 500 in which function types A, B and D are (Official). The firmware-managing unit 214 finds that the combinations in which the function types A, B and D are all (Official) are combinations 1 and 2. Here, the version of combination 2 is (ver. 2.0) and is larger than the version (ver. 1.5) of combination 1, so the firmware-managing unit 214 determines that combination 2 is the combination of the most recent versions, and notifies the system-control unit 216. Moreover, in the case of user-identification information 401 (AA0001), the function type C is (none), so the firmware-managing unit 214 also notifies the system-control unit 216 that function type C is (none).

Moreover, the firmware-managing unit 214, when there is an update request from the MFP 100 of the user-identification information 401 (AA0002), checks the combination of function types A to D by referencing the user-management table 400A. In the case of user-identification information 401 (AA0002), even though function type D is (none), this is a combination in which function types A to C are all (Official). In this case, the firmware-managing unit 214 searches for a combination from the update-information-management table 500 in which function types A to C are all (Official). The firmware-managing unit 214 finds that the combinations in which the function types A to C are all (Official) are combinations 1 and 2. Here, the version of combination 2 is (ver. 2.0) and is larger than the version (ver. 1.5) of combination 1, so the firmware-managing unit 214 determines that combination 2 is the combination of the most recent versions, and notifies the system-control unit 216. Moreover, in the case of user-identification information 401 (AA0002), the function type D is (none), so the firmware-managing unit 214 also notifies the system-control unit 216 that function type D is (none).

Furthermore, the firmware-managing unit 214, when there is an update request from the MFP 100 of the user-identification information 401 (AA0003), checks the combination of function types A to D by referencing the user-management table 400A. In the case of user-identification information 401 (AA0003), even though function types B to D are (Official), this is a combination in which function type A is (Custom), so the firmware-managing unit 214 searches for a combination in which function type A is (Custom) and function types B to D are (Official). In this case, the firmware-managing unit 214 finds that the combination in which function type A is (Custom) and function types B to D are (Official) is combination 3, and notifies the system-control unit 216 of combination 3.

Moreover, the firmware-managing unit 214, when there is an update request from the MFP 100 of the user-identification information 401 (AA0004), for example, checks the combination of function types A to D by referencing the user-management table 400A. In the case of user-identification information 401 (AA0004), even though function types B and D are (Official), this is a combination in which function types A and C are (Custom), so the firmware-managing unit 214 searches for a combination in which function types A and C are (Custom) and function types B and D are (Official). In this case, the firmware-managing unit 214 finds that the combination in which function types A and C are (Custom) and function types B and D are (Official) is combination 4, and notifies the system-control unit 216 of combination 4. When the combination of firmware that is included in the update request is not registered in the update-information-management table 500, the firmware-managing unit 214 notifies the system-control unit 216 that no combination is registered.

As described above, the firmware-managing unit 214 checks the function name and the version number of firmware information for each function type that corresponds to user-identification information 401 by referencing the user-management table 400A in accordance with an update request. Next, the firmware-managing unit 214 extracts combinations of firmware that include all of the function types A to D that correspond to the user-identification information 401 by referencing the update-information-management table 500. The firmware-managing unit 214 specifies the combination of the most recent versions of firmware (in this embodiment, the version with the largest version number) from the extracted combinations, and notifies the system-control unit 216.

In this embodiment, the "most recent version" is the most recent version of function types A to D (in this embodiment, version having the largest version number) of the versions of firmware that are registered in the update-information-management table 500. Therefore, the most recent version of firmware exists for each function type A to D in the update-information-management table 500.

The firmware-managing unit 214 may specify the combination that includes the largest amount of the most recent versions of firmware as the combination of the most recent versions of firmware. When there are plural combinations that include the largest amount of the most recent versions of firmware, the version information of firmware is compared for each function type A to D among the plural combinations. Then, the combination that includes the largest amount of the newest versions of firmware may be specified as the combination of the most recent versions of firmware. Alternately, when there are plural combinations that include the largest amount of the most recent versions of firmware, the version information of the plural combinations of firmware may each respectively be compared with the version information of the firmware that corresponds with the user-identification information 401 of the user that has requested the update. Then, the combination that includes a larger amount of the most recent versions of firmware than the versions of firmware that corresponds to the user-identification information 401 may be specified as the combination of the most recent versions of firmware. In these methods, when it is not possible to specify one combination of the most recent versions of firmware, the system-control unit 216 may make an inquiry to the MFP 100 about the combination of firmware by which to perform the update.

Figure 4:
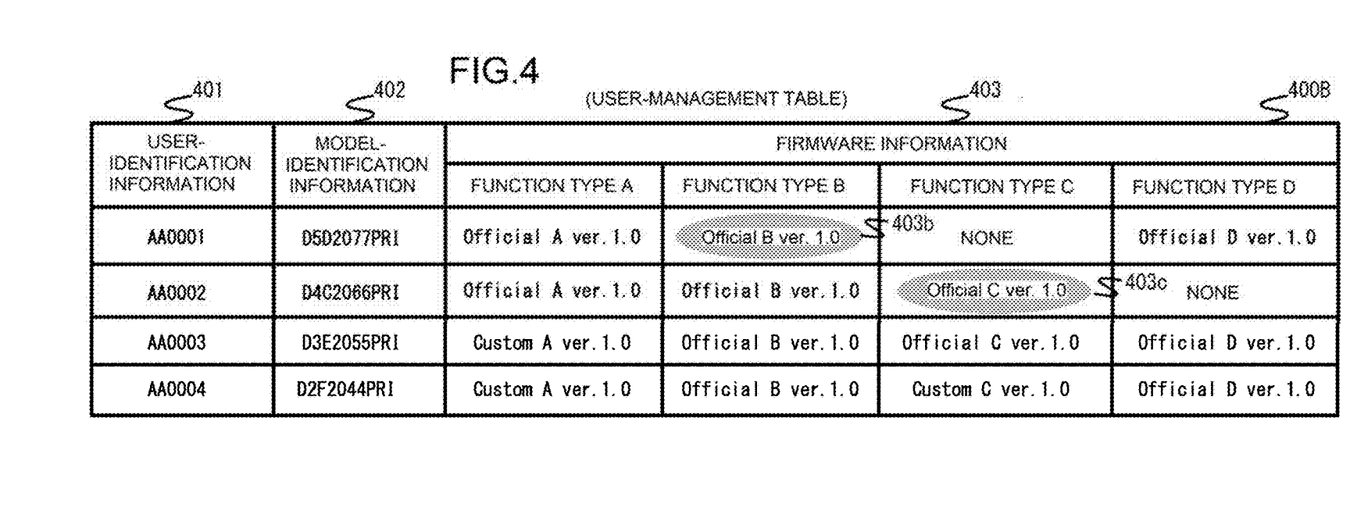
FIG. 4 illustrates another user-management table in which the contents of the user-management table in FIG. 3A are changed.

Next, FIG. 4 illustrates another example of a management table that is managed by the information-distributing server 200. FIG. 4 illustrates a user-management table 400B that is obtained by adding special notes to the contents of the user-management table 400A in FIG. 3A indicating the desire of each user. In other words, in the case of user-identification information 401 (AA0001), for example, special note information 403*b* (shaded portion) is added to the function type B (Official B ver. 1.0) of the firmware information 403. Moreover, in the case of user-identification information 401 (AA0002), for example, special note information 403*c* (shaded portion) is added to the function type C (Official C ver. 1.0) of the firmware information 403. This special note information 403*b*, 403*c* corresponds to the desire of the user, for example, and are contents, for example, that do not need updating. By adding special note information 403*b*, 403*c* to the user-management table 400B in this way, it is possible to avoid updating firmware of a specified function.

In other words, there may be cases, for example, in which a user may not want to update the firmware of an arbitrary function. This is because, when the firmware of an arbitrary function is updated, firmware that is upgraded and/or downgraded, for example, will be updated. In that case, by registering any one function type A to D that does not require updating in the information-distributing server 200 together with the user-identification information 401, the firmware-managing unit 214 can notify the system-control unit 216 about the any one function type A to D that does not require updating. As a result, the system-control unit 216 does not transmit the firmware of the any one function type A to D that does not require updating to the MFP 100, so it is possible on the MFP 100 side to avoid updating firmware that has been upgraded and/or downgraded. Moreover, special note information that indicates that updating is not necessary is added to the user-management table 400B, so the firmware-managing unit 214 can exclude firmware for which no comparison or update is required from being a target of comparison of version information.

Figure 5:
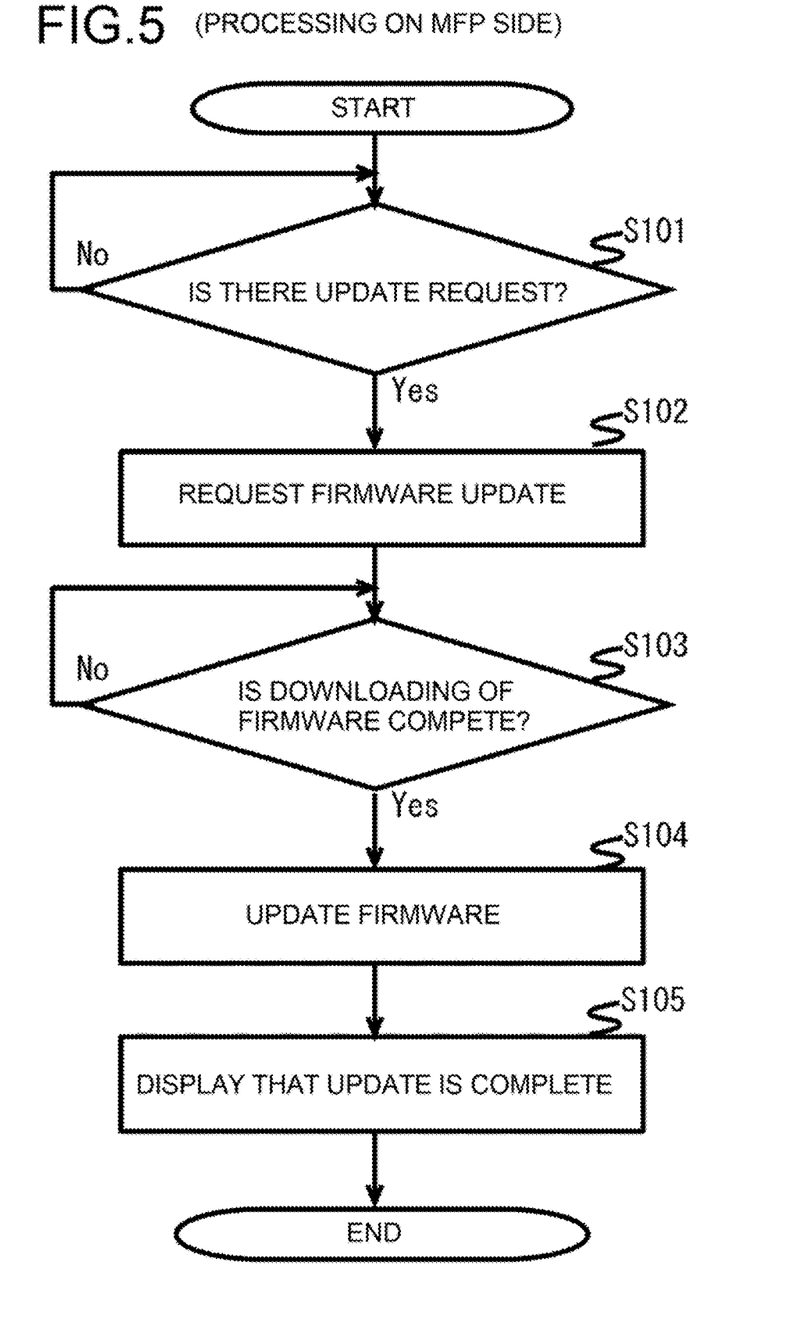
FIG. 5 illustrates steps of a firmware update process in the MFP in FIG. 1.

Next, the update process for updating firmware on the MFP 100 side will be explained with reference to FIG. 5. The following explanation will include the case before firmware is updated as illustrated in FIG. 2A, and the case after firmware is updated as illustrated in FIG. 2B. Moreover, in the following, the case will be explained in which the user-identification information is (AA0003) and the model-identification information 402 is (D3E2055PRI).

(Step S101)

The system-control unit 121 determines whether or not there is an update request.

In this case, when there is no notification from the panel-operation-control unit 119 via the panel unit 105 indicating that there is a firmware update instruction, the system-control unit 121 determines that there is no firmware update request (step S101: NO).

However, when there is a notification from the panel-operation-control unit 119 via the panel unit 105 indicating that there is a firmware update instruction, the system-control unit 121 determines that there is a firmware update request (step S101: YES), and processing moves to step S102.

(Step S102)

The system-control unit 121 requests firmware update.

In this case, the system-control unit 121, via the communication-control unit 114, requests an update that includes the model-identification information 402 (D3E2055PRI) in FIG. 3A. The system-control unit 121 may also request an update that includes the user-identification information 401 (AA0003) in addition to the model-identification information 402 (D3E2055PRI).

(Step S103)

The system-control unit 121 determines whether or not downloading of firmware is complete.

In this case, when there is no notification from the communication-control unit 114 indicating that downloading of firmware is complete, the system-control unit 121 determines that downloading of firmware is not complete (step S103: NO).

However, when there is a notification from the communication-control unit 114 indicating that downloading of firmware is complete, the system-control unit 121 determines that downloading of firmware is complete (step S103: YES), and processing moves to step S104.

(Step S104)

The system-control unit 121 updates firmware.

In this case, the system-control unit 121 updates the firmware before updating by installing firmware that corresponds to the combination 3 in the update-information-management table 500 described above that is downloaded from the information-distributing server 200.

In other words, the combination 3 is (Custom A ver. 2.0), (Official B ver. 1.5), (Official C ver. 1.5), (Official D ver. 1.5).

When doing this, the firmware-managing unit 118 rewrites the firmware information 116a to 116d in FIG. 2A to (Custom A ver. 2.0), (Official B ver. 1.5), (Official C ver. 1.5), (Official D ver. 1.5) as illustrated in FIG. 2B.

(Step S105)

The system-control unit 121 displays that update is complete.

In this case, the system-control unit 121 receives a notification from the firmware-managing unit 118 indicating that rewriting is complete, and then via the panel-operation-control unit 119, causes the panel unit 105 to display that update is complete.

Figure 6:
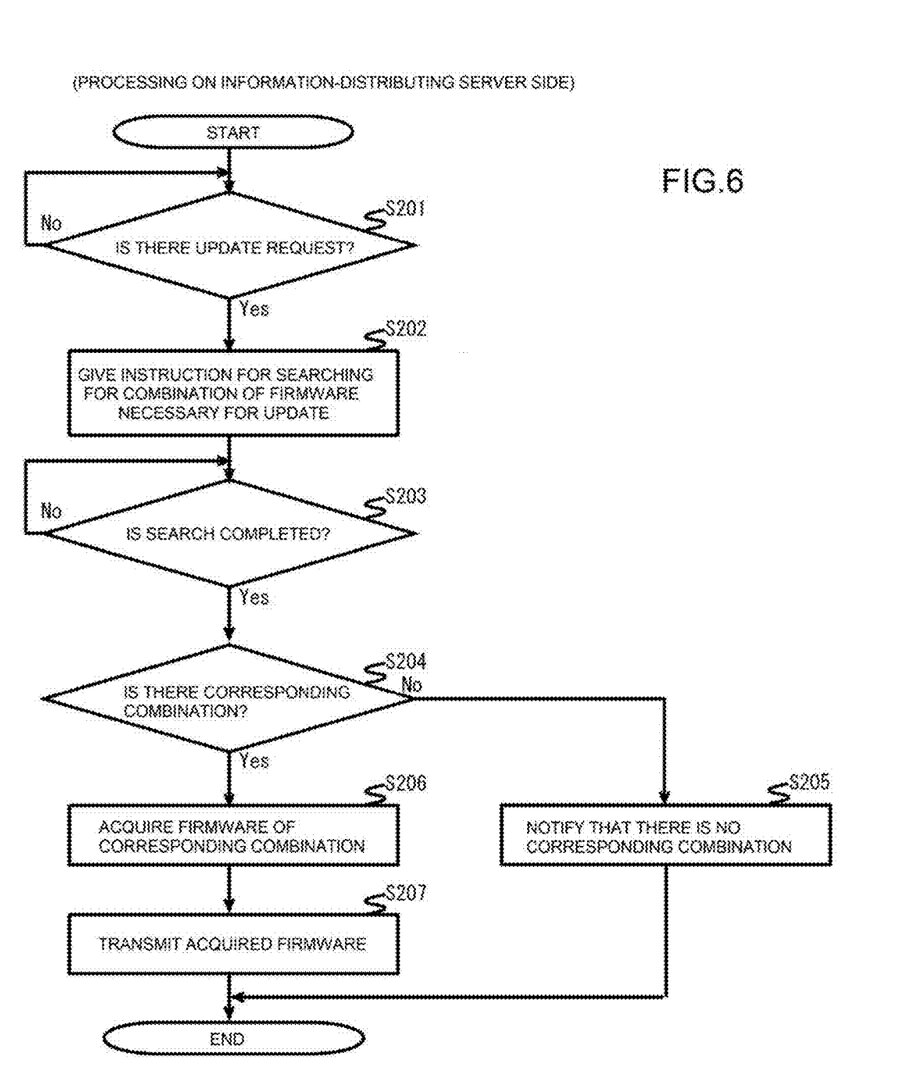
FIG. 6 illustrates steps of processing on the information-distributing server side in FIG. 1.

Next, processing on the information-distributing server 200 side will be explained with reference to FIG. 6. In the following, the case will be explained in which the user-identification information 401 that is included in the update request from the MFP 100 side is (AA0003), and the model-identification information 402 is (D3E2055PRI).

(Step S201)

The system-control unit 216 determines whether or not there is an update request.

In this case, when there is no notification from the communication-control unit 213 indicating that an update request is received, the system-control unit 216 determines that there is no update request (step S201: NO).

However, when there is a notification from the communication-control unit 213 indicating that an update request is received, the system-control unit 216 determines that there is an update request (step S201: YES), and processing moves to step S202.

(Step S202)

The system-control unit 216 gives an instruction to search for a combination of firmware that is necessary for the update.

In this case, the system-control unit 216 gives an instruction to the firmware-managing unit 214 to search for a combination of firmware. Moreover, the system-control unit 216 notifies the firmware-managing unit 214 of the user-identification information 401 (AA0003) and model-identification information 402 (D3E2055PRI) that is included in the update request.

At this time, the firmware-managing unit 214 searches for a combination of function types A to D that correspond to the user-identification information 401 (AA0003) and model-identification information 402 (D3E2055PRI) by referencing the user-management table 400A in FIG. 3A. The firmware-managing unit 214 searches for a combination in which function type A is (Custom) and the function types B to D are (Official), and then searches for the same combination as in user-management table 400A by referencing the firmware update-information-management table 500 in FIG. 3B. In this case, the firmware-managing unit 214 determines that combination 3 in which function type A is (Custom) and function types B to D are (Official) is the same as the combination in the user-management-table 400A, and notifies the system-control unit 216. When the firmware-managing unit 214 is not able to find a combination from the update-information-management table 500 that is the same as in the user-management table 400A, the firmware-managing unit 214 notifies the system-control unit 216 that a combination is not registered.

(Step S203)

The system-control unit 216 determines whether or not the search is complete.

In this case, the system-control unit 216 waits for a notification from the firmware-managing unit 214 (step S203: NO), and when there is a notification from the firmware-managing unit 214, determines that the search is complete (step S203: YES), then processing moves to step S204.

(Step S204)

The system-control unit 216 determines whether or not there is a corresponding combination.

In this case, when there is a notification from the firmware-managing unit 214 indicating combination 3, the system-control unit 216 determines that there is a corresponding combination (step S204: YES), and processing moves to step S206.

However, when there is a notification from the firmware-managing unit 214 indicating that a combination is not registered, the system-control unit 216 determines that there is no corresponding combination (step S204: NO), and processing moves to S205.

(Step S205)

The system-control unit 216 notifies that there is no corresponding combination.

In this case, the system-control unit 216, via the communication-control unit 213, notifies the MFP 100 from which there is an update request, that there is no corresponding combination.

(Step S206)

The system-control unit 216 acquires the firmware of the corresponding combination.

In this case, the system-control unit 216 reads the firmware that corresponds to combination 3 from the HDD 202.

Here, combination 3, as illustrated in FIG. 3B, is (Custom A ver. 2.0), (Official B ver. 1.5), (Official C ver. 1.5) and (Official D ver. 1.5).

(Step S207)

The system-control unit 216 transmits the acquired firmware.

In this case, the system-control unit 216, via the communication-control unit 213, transmits the firmware corresponding to combination 3 that is read from the HDD 202 to the MFP 100, and processing ends.

The system-control unit 216 may instruct the firmware-managing unit 214 in step S202 to reference the user-management table 400B illustrated in FIG. 4. In this case, when, for example, the user-identification information 401 that is included in the update request is (AA0001) and the model-identification information 402 is (D5D2077PRI), the firmware-managing unit 214 references the user-management table 400B in step S202. Then, the firmware-managing unit 214 confirms that special note information 403b (shaded portion) that indicates, for example, that updating contents is not necessary, is added to the function type B (Official B ver. 1.0) of the firmware information 403. Moreover, the firmware-managing unit 214 searches for a combination that is the same as in the user-management table 400B by referencing the firmware update-information table 500 in FIG. 3B. In this case, the firmware-managing unit 214 determines that of the combinations 1 and 2 in which the function types A, B, D are (Official), combination 2 is the combination of the most recent versions, and notifies the system-control unit 216 of combination 2. Moreover, the firmware-managing unit 214 notifies the system-control unit 216 that updating of function type B is not necessary, and that there is no function type C. The system-control unit 216 reads the firmware that corresponds to combination 2 from the HDD 202. In this case, the system-control unit 216 confirms that updating function type B is not necessary and that there is no function type C, and transmits the firmware of (Official A ver. 1.5) and (Official D ver. 1.5) in FIG. 3B to the MFP 100 that has the update request.

In this way, in this embodiment, the EEPROM 116 (storage device) stores firmware that is divided according to each function and that controls standard installed functions that are correlated with model-identification information 116A, and firmware that controls functions of added optional apparatuses. The firmware-managing unit 118 manages firmware information 116a to 116d that includes the versions of the respective firmware. When there is an update instruction, the system-control unit 121, via the panel unit 105, requests the information-distributing server 200 that distributes firmware that corresponds to the combination of the most recent versions of the respective firmware that is correlated with the model-identification information 116A to perform an update that includes the model-identification information 116A. Moreover, the system-control unit 121 updates the firmware that is stored in the EEPROM 116 (storage device) to the firmware that corresponds to the combination of the most recent versions downloaded from the information-distributing server 200. After that, the firmware-managing unit 118 updates the versions of the firmware information 116a to 116d.

As a result, by adding any optional apparatus, the system-control unit 121 can update the firmware that is stored in the EEPROM 116 (storage device) to firmware that corresponds to the combination of the most recent versions that are correlated with the model-identification information 116A that is downloaded from the information-distributing server 200. This is possible even when the firmware that controls the function of the added optional apparatus is newly installed. The optional apparatus is, for example, an automatic feeder for double-sided documents that automatically supplies paper that is to be printed on both sides, a finisher that performs sorting and stapling of plural sheets during printing, mailboxes that are specified as the respective output destinations of plural trays and that prevent mixing of outputted sheets, and the like. Therefore, work for setting a combination of firmware for update is not necessary, and it is possible to eliminate mistakes in settings. Consequently, even when any optional apparatus is added, it is possible to easily and reliably perform an update of firmware.

In this embodiment, an example was explained in which the MFP 100 includes a panel unit 105, however, the embodiment is not limited to this example, and the panel unit 105 may be included in a managing apparatus that is capable of communicating with the MFP 100 via a network or the like. In that case, processing via the panel unit 105 that is explained in this embodiment is executed by the managing apparatus communicating with the MFP 100 via the panel unit 105 of the managing apparatus. Here, the managing apparatus may be a portable terminal having a touch panel as the panel unit 105, or may be a personal computer that has a panel unit 105 in which the display and operation unit are separate.

Furthermore, in this embodiment, the case was explained in which the electronic apparatus was applied to a MFP 100, however, the embodiment is not limited to this example, and may also be applied to other electronic apparatuses such as a PC (Personal Computer), portable terminal, tablet terminal and the like in which plural functions are installed.

Moreover, instead of the EEPROM 116 it is also possible to use a storage device such as another nonvolatile semiconductor storage apparatus, another HDD or the like.

In a software-update-support apparatus of the typical technology described above, when a combination of version information of each software that is installed in a PC is not a combination of guaranteed version information, a software-update-support program on the managing server side can cause the necessary software to be downloaded and updated.

In other words, in this software-update-support apparatus, the managing server side is provided with a guaranteed version combination table for determining whether or not a combination of version information of each software that is installed in a PC is a combination of guaranteed version information. Then, by an update request from the PC, the necessary software for a combination of version information for which operation is guaranteed is specified and downloaded on the managing server side.

Incidentally, in the image forming apparatus described above, optional apparatuses such as an automatic feeder for double-sided documents that automatically supplies paper that is to be printed on both sides, a finisher that performs sorting and stapling of plural sheets during printing, mailboxes that are specified as the respective output destinations of plural trays and that prevent mixing of outputted sheets, and the like are prepared for example. Therefore, when any optional apparatus is added, firmware for controlling the function of the added optional apparatus is newly installed.

In this kind of situation as well, preferably the combination of all of the firmware, including the firmware that controls the function of the added optional apparatus, is a combination of the most recent versions of firmware that guarantee operation. In this case, it is considered that as in the software update method in typical technology, an update request is sent to the managing server side, and using a guaranteed-version-combination table, the managing server side causes the firmware necessary for the combination of guaranteed version information to be downloaded to the image forming apparatus.

Incidentally, in the software update method of typical technology, updating a combination of all of the firmware, including the firmware that controls the function of an added optional apparatus, to the most recent versions of firmware that guarantee operation is not considered. Therefore, the combination of all firmware cannot be updated to the most recent versions of firmware that guarantee operation.

In this case, the update firmware for forming the combination of all of the firmware into a combination of the most recent versions of firmware that guarantee operation is obtained from a storage device such as a USB memory or the like. However, not only the standard installed functions for each function differ, but the combination of each of the respective standard installed functions and the functions of added optional apparatuses differ, so there is a problem in that not only does the work of setting the combination of update firmware become difficult, but there is also a possibility of the occurrence of setting mistakes.

With the electronic apparatus, version checking system and recording medium according to the present disclosure, by updating to firmware that is downloaded from the information-distributing server and that corresponds to a combination of the most recent versions that are correlated with the model-identification information, work for setting a combination of update firmware becomes unnecessary, and it is possible to eliminate setting mistakes. Therefore, even when any optional apparatus is added, updating firmware can be performed easily and reliably.

What is claimed is:

1. A version checking system comprising:
   an electronic apparatus;
   a managing apparatus that is capable of communicating with the electronic apparatus; and
   an information-distributing server; wherein
   the managing apparatus has a panel unit;
   the electronic apparatus comprises:
     a storage device that stores firmware that is divided according to function and that controls standard installed functions that are correlated with model-identification information that corresponds to user-identification information, and firmware that controls functions of added optional apparatuses;
     a first firmware-managing unit that manages firmware information that includes each versions of the respective firmware stored in the storage device; and
     a first system-control unit that, when there is an update instruction via the panel unit, requests the information-distributing server to perform an update that includes the model-identification information;
   the information-distributing server is a server that distributes firmware that corresponds to a combination of the most recent versions of the respective firmware that is correlated with the model-identification information, and comprises:
     a second firmware-managing unit that manages a combination of versions of firmware for each function; and
     a second system-control unit that transmits firmware corresponding to a specified combination to the electronic apparatus;
   the first system-control unit updates the firmware that is stored in the storage device to firmware that corresponds to a combination of the most recent versions that are downloaded from the information-distributing server;
   the first firmware-managing unit changes the versions of the firmware information; and
   the second firmware-managing unit, in response to the update request, specifies firmware corresponding to a combination that includes the largest amount of the most recent versions of the firmware that is correlated with the model-identification information.

2. The version checking system according to claim 1, wherein
   any one of the firmware that is stored by the storage device is customized according to changes in the specifications of the function.

3. A version checking system comprising:
   an electronic apparatus;
   a managing apparatus that is capable of communicating with the electronic apparatus; and
   an information-distributing server; wherein
   the managing apparatus has a panel unit;
   the electronic apparatus comprises:
     a storage device that stores firmware that is divided according to function and that controls standard installed functions that are correlated with model-identification information that corresponds to the user-identification information, and firmware that controls functions of added optional apparatuses;
     a first firmware-managing unit that manages firmware information that includes each version of the respective firmware stored in the storage device; and
     a first system-control unit that, when there is an update instruction via the panel unit, requests the information-distributing server to perform an update that includes the model-identification information;
   the information-distributing server is a server that distributes firmware that corresponds to a combination of the most recent versions of the respective firmware that is correlated with the model-identification information, and comprises:
     a second firmware-managing unit that manages a combination of versions of firmware for each function; and
     a second system-control unit that transmits firmware corresponding to a specified combination to the electronic apparatus;
   the first system-control unit updates the firmware that is stored in the storage device to firmware that corresponds to a combination of the most recent versions that are downloaded from the information-distributing server;
   the first firmware-managing unit changes the versions of the firmware information; and
   the second firmware-managing unit,
   when there are plural combinations that include the largest amount of the most recent versions of firmware that is correlated with the model-identification information,
   compares the version information of firmware for each function type among the plural combinations, and
   specifies a combination that includes the largest amount of the newest versions of firmware.

4. The version checking system according to claim 3, wherein
   any one of the firmware that is stored by the storage device is customized according to changes in the specifications of the function.

5. A version checking system comprising:
   an electronic apparatus;
   a managing apparatus that is capable of communicating with the electronic apparatus; and
   an information-distributing server; wherein
   the managing apparatus has a panel unit;
   the electronic apparatus comprises:
     a storage device that stores firmware that is divided according to function and that controls standard installed functions that are correlated with model-identification information that corresponds to the user-identification information, and firmware that controls functions of added optional apparatuses;
     a first firmware-managing unit that manages firmware information that includes each version of the respective firmware stored in the storage device; and
     a first system-control unit that, when there is an update instruction via the panel unit, requests the information-distributing server to perform an update that includes the model-identification information;

the information-distributing server is a server that distributes firmware that corresponds to a combination of the most recent versions of the respective firmware that is correlated with the model-identification information, and comprises:
  a second firmware-managing unit that manages a combination of versions of firmware for each function; and
  a second system-control unit that transmits firmware corresponding to a specified combination to the electronic apparatus;

the first system-control unit updates the firmware that is stored in the storage device to firmware that corresponds to a combination of the most recent versions that are downloaded from the information-distributing server;

the first firmware-managing unit changes the versions of the firmware information; and the second firmware-managing unit, when there are plural combinations that include the largest amount of the most recent versions of firmware that is correlated with the model-identification information, specifies a combination that includes a larger amount of the most recent versions of firmware than the versions of firmware that corresponds to the user-identification information.

6. The version checking system according to claim 5, wherein any one of the firmware that is stored by the storage device is customized according to changes in the specifications of the function.

* * * * *